F. C. EILERSEN.
PIE MAKING MACHINE.
APPLICATION FILED OCT. 27, 1921.

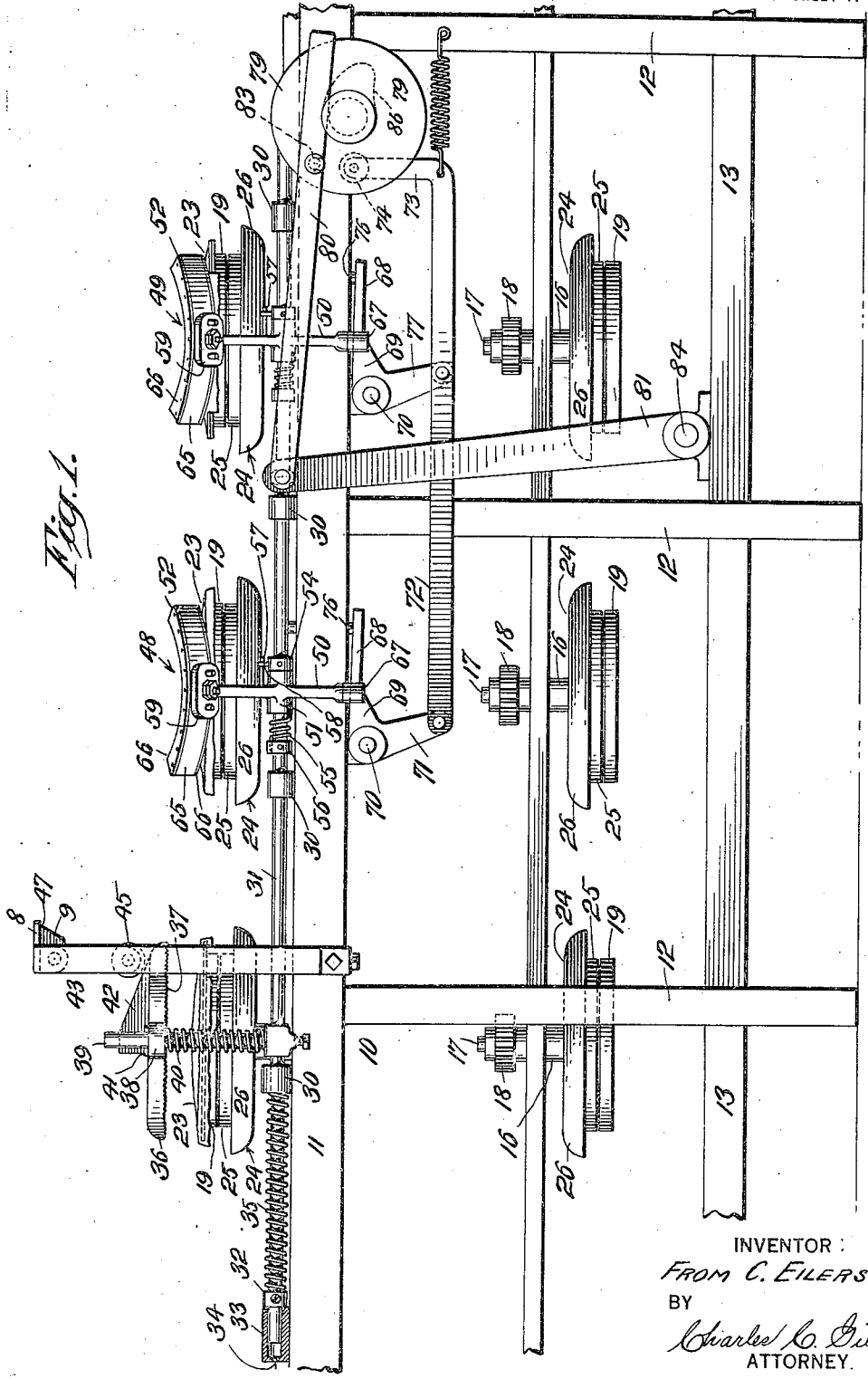

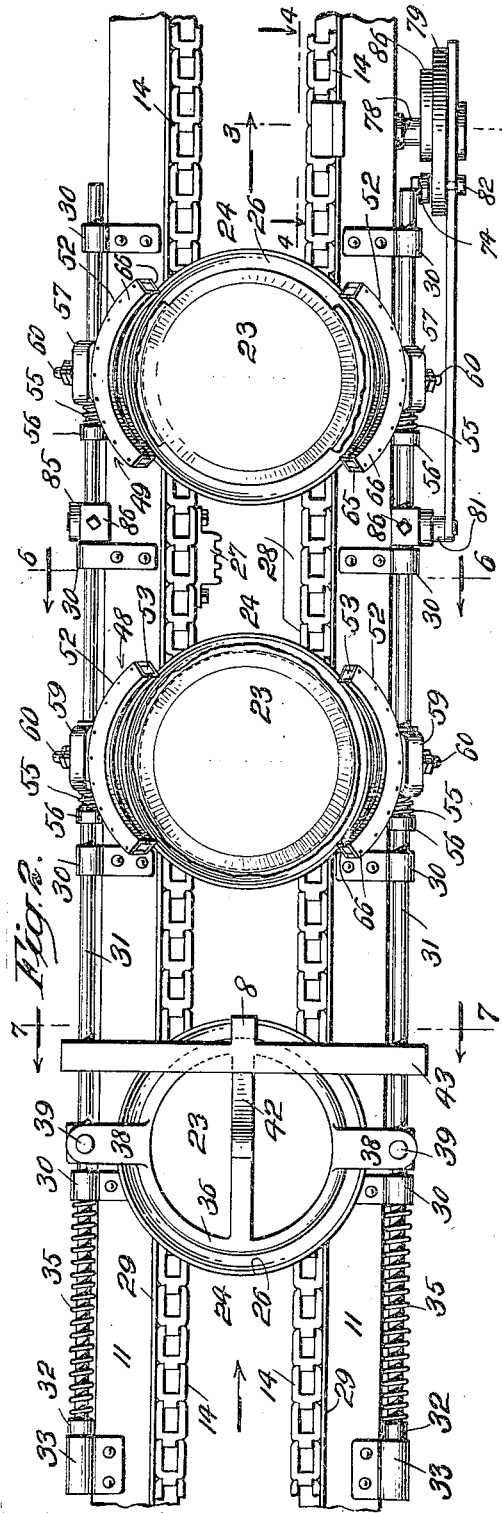

1,421,430.

Patented July 4, 1922.
4 SHEETS—SHEET 3.

INVENTOR:
FROM C. EILERSEN.
BY
Charles C. Gill,
ATTORNEY.

F. C. EILERSEN.
PIE MAKING MACHINE.
APPLICATION FILED OCT. 27, 1921.
1,421,430.
Patented July 4, 1922.
4 SHEETS—SHEET 4.
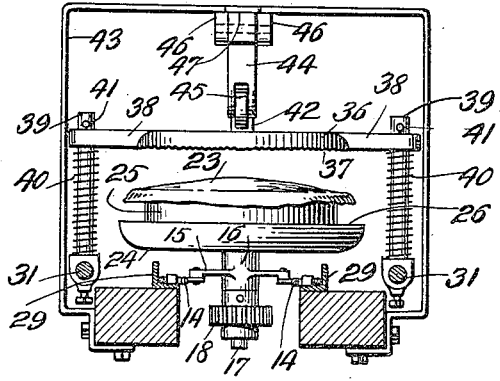
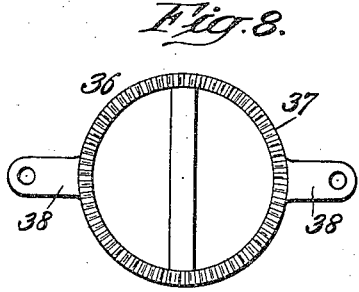
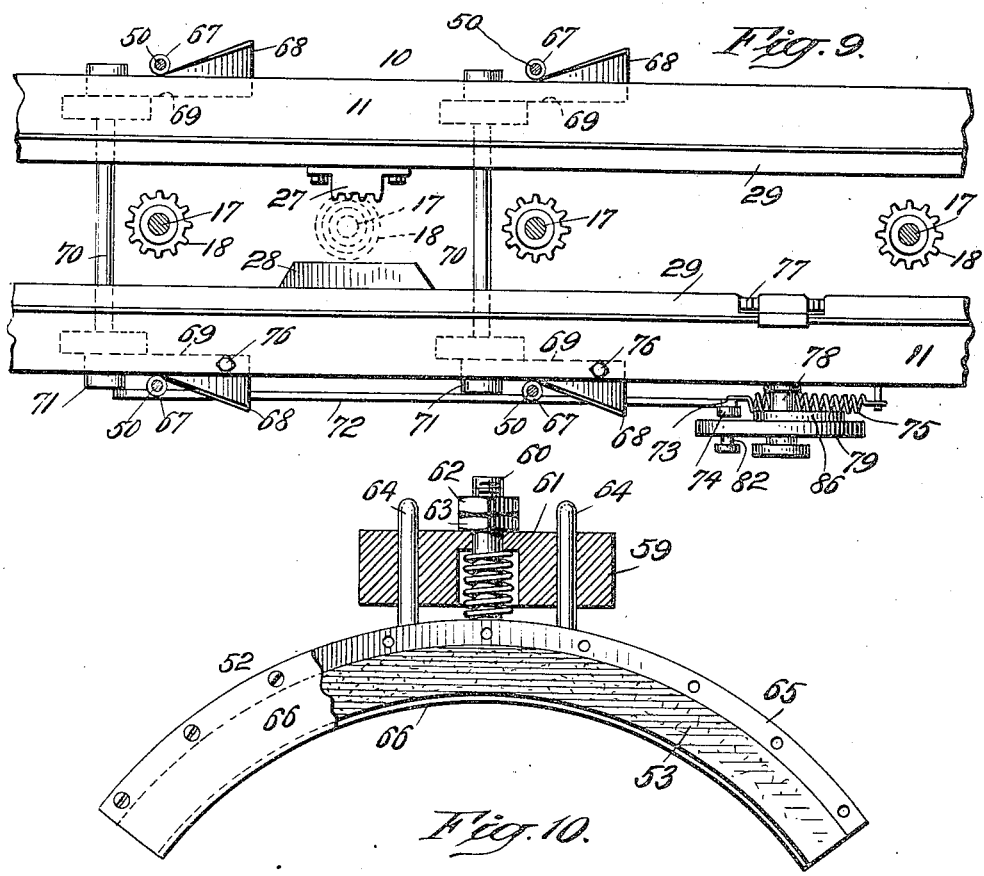
INVENTOR:
FROM C. EILERSEN.
BY
Charles C. Gill,
ATTORNEY.

UNITED STATES PATENT OFFICE.

FROM C. EILERSEN, OF JERSEY CITY, NEW JERSEY.

PIE-MAKING MACHINE.

1,421,430. Specification of Letters Patent. Patented July 4, 1922.

Application filed October 27, 1921. Serial No. 510,341.

*To all whom it may concern:*

Be it known that I, FROM C. EILERSEN, citizen of the United States, and resident of Jersey City, in the county of Hudson and State of New Jersey, have invented certain new and useful Improvements in Pie-Making Machines, of which the following is a specification.

The invention pertains to means for crimping the crust-dough of pies along the rim or outer edge of the pie-tins and also for trimming off the surplus portion of the crust-dough of pies along the outer edge of pie-tins, one object of the invention being to provide a machine which shall be efficient for the purposes stated, rapid and automatic in operation, self-adjusting to irregularities and variations along the edges of the pies and their tins and adjustable to pie-tins varying in diameter.

In accordance with my invention the pies while their tins or plates are held in suitable supports, are carried along by an endless conveyor and each pie at a predetermined location is subjected to an edge crimping ring or frame and thereafter, when in a further advanced position, is subjected to the action of two oppositely arranged segmental edge trimmers which remove two opposite sections of the over-hanging crust-dough from the edge of the rim of the pie-tin, after which, during its onward travel, the pie is given a one-quarter turn and thence carried into position whereat it is again subjected to two oppositely disposed pie-dough crust-trimmers which remove the other two opposite sections of the overhanging dough from the rim of the pie-tin. The more essential part of the present invention relates to the trimming off of the surplus crust-dough from the edges of the pie tins, and in carrying out this feature of the invention I first trim off two opposite sections, each something more than one-quarter of the periphery of the pie, of the overhanging dough from the pie-tin and then give the pie and its support a one-quarter turn so as to position the other two opposite sections of the pie for action by a second pair of crust-dough trimmers, which thereafter act to trim off said other sections, leaving the entire pie properly trimmed. My invention also provides means for adapting the segmental crust-dough trimming devices to the irregularities that may exist in the dough and in the edges of the tins and also for adjusting said trimming devices to suit variations in the sizes of the tins.

The invention will be fully understood from the detailed description hereinafter presented, reference being had to the accompanying drawings, in which:

Fig. 1 is a side elevation, partly broken away and partly in section, of a pie-crust trimming machine embodying my invention, the parts being shown in normal position, with a pie indicated as having been carried below the crimping ring and thereafter to the successive crust-dough trimming mechanisms;

Fig. 2 is a top view of the same, showing the pie as having been crimped and then moved to position to have two opposite sections of its crust-dough trimmed off at the edges of the pie-plate or tin and the same pie as having had said sections trimmed off and as having traveled a short distance and been rotated to carry the two other opposite sections of its crust-dough to position to be trimmed off at the edge of the pie-plate;

Fig. 3 is a vertical transverse section through a portion of the machine, taken on the dotted line 3—3 of Fig. 4;

Fig. 4 is a longitudinal section through a portion of the machine, taken on the dotted line 4—4 of Fig. 2, Fig. 4 showing the mechanism of Fig. 3 and taken from the left hand end thereof;

Fig. 7 is a vertical transverse section through an upper portion of the machine, taken on the dotted line 7—7 of Fig. 2 and illustrating a pie as having been carried below the crimping ring or frame preparatory to the descent of said ring against the crust-dough at the rim of the pie-tin;

Fig. 8 is a detached bottom view of the pie crimping ring or frame;

Fig. 9 is a top view, partly broken away and partly in section, of a portion of the machine, and Fig. 10 is a top view, partly broken away and partly in section and on a larger scale, of one of the segmental pie-crust dough trimmers, with the means for supporting the same.

Figure 5:
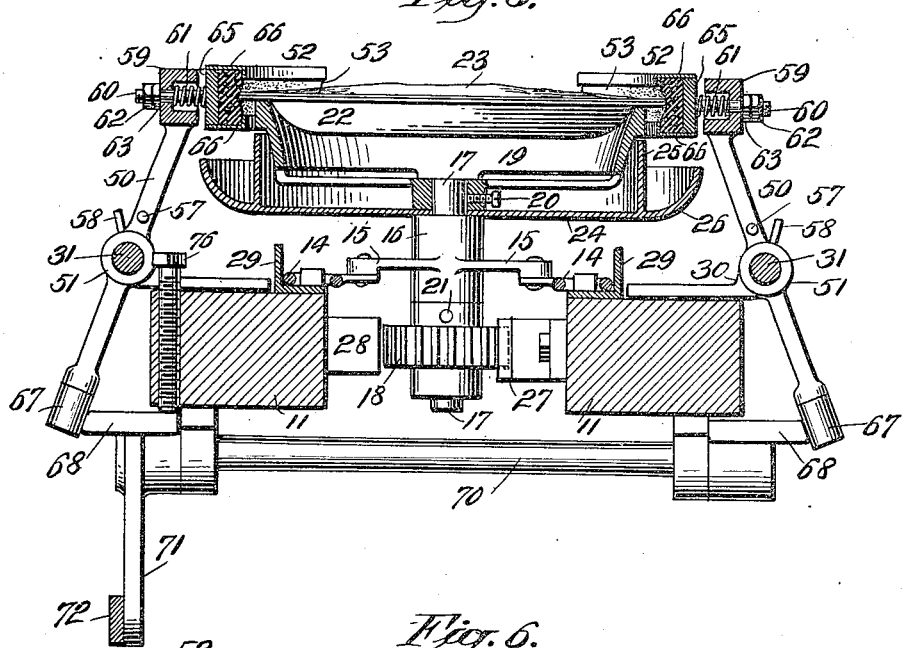
Fig. 5 is a vertical transverse section, on a larger scale, through the upper portion of the machine and shows a pie in position having opposite portions of its periphery engaged by the segmental trimming devices, which are shown in operative position.

In the drawings, 10 designates a suitable or ordinary supporting table or frame for the operative mechanism of the machine, this table comprising longitudinal side rails 11, supporting legs 12 and lower beams 13 connecting said legs.

14, 14 designate two known parallel endless conveying chains adapted to travel lengthwise of the table or frame 10 and being mounted on sprocket-wheels, not shown, substantially as disclosed in Letters Patent No. 1,384,907 granted July 19, 1921 to John J. Linden.

The sprocket-chains 14 are connected together at suitable intervals by transverse bars 15 (Figs. 5 and 6) having central tubular sleeve portions 16 through which vertical shafts 17 extend, said shafts having on their inner portions gear-wheels 18 and upon their outer ends circular pie-tin supporting frames 19. The frames 19 are fixed to the shafts 17 by means of set-screws 20 (Fig. 5), and the gear-wheels 18 are pinned to the shafts 17 by means of pins 21, and thus when the gear-wheels 18 are rotated, the shafts 22 will receive corresponding motion and impart rotary movement to the supporting frames 19 and to the pies carried by them, a pie-tin being shown in Fig. 5 and numbered 22, while the pie therein is numbered 23. Upon the vertical sleeves 16 and positioned by the outer ends of the shafts 17 are circular holding frames 24 which receive the circular frames 19 and are formed with a vertical circular side flange 25 and exterior thereto with a downwardly and inwardly curved flange 26 between which and the flange 25 is formed a circular trough adapted to receive the trimmings of the pie-crust dough removed and allowed to fall from the edge of the pie-tin 22 and over the frame 19.

The sprocket-chains 14, arms 15, sleeves 16, shafts 17, gear-wheels 18, frames 19 and frames 24, are features described in the aforesaid Letters Patent No. 1,384,907 and therefore do not require more specific description herein. The said features are duplicated along the length of the chains 14 so as to provide a pie-crust trimming machine of adequate capacity. Through a definite portion of the line of travel of the chains 14 the shafts 17 are given a limited rotary motion so as to effect the partial rotation of the frames 19 and pies carried thereby, this being for the purpose of co-operating with other features for positioning the pies with respect to the pie-crust trimming devices. The means for effecting the rotation of the shafts 17 while said shafts successively pass a definite location, consists of a short rack-bar 27 secured to one of the side rails 11, as shown in Figs. 2, 5, 6 and 9, said rack-bar being projected inwardly as shown in Fig. 2 in position to be engaged by the gear-wheels 18 as said gear-wheels are successively carried thereto during the travel of the chains 14 along the length of the machine. During the travel of the chains 14 the gear-wheels 18 roll against said rack-bar 27 and are rotated thereby and impart their movement to the shafts 17 and frames 19. The rotation of the shafts 17 and frames 19 is effected only during the travel of the gear-wheels 18 against the rack-bar 27 and during all of the other portions of the travel of the chains 14 the shafts 17 and frames 19 have no rotary movement. The rack-bar 27 is very short and only imparts a partial rotation to a gear-wheel 18 passing along it, and hence the frame 19, with the pie supported thereby is only given a partial rotation during their travel along said bar 27. Opposite to the rack-bar 27 I fasten to the other side rail 11 of the supporting frame, a block 28 whose purpose is to keep the gear-wheels 18 pressed into engagement with the rack-bar 27 while said gear-wheels are traveling along said bar.

The chains 14 are guided in their traveling movement by angle-iron tracks or rails 29, as usual.

Figure 6:
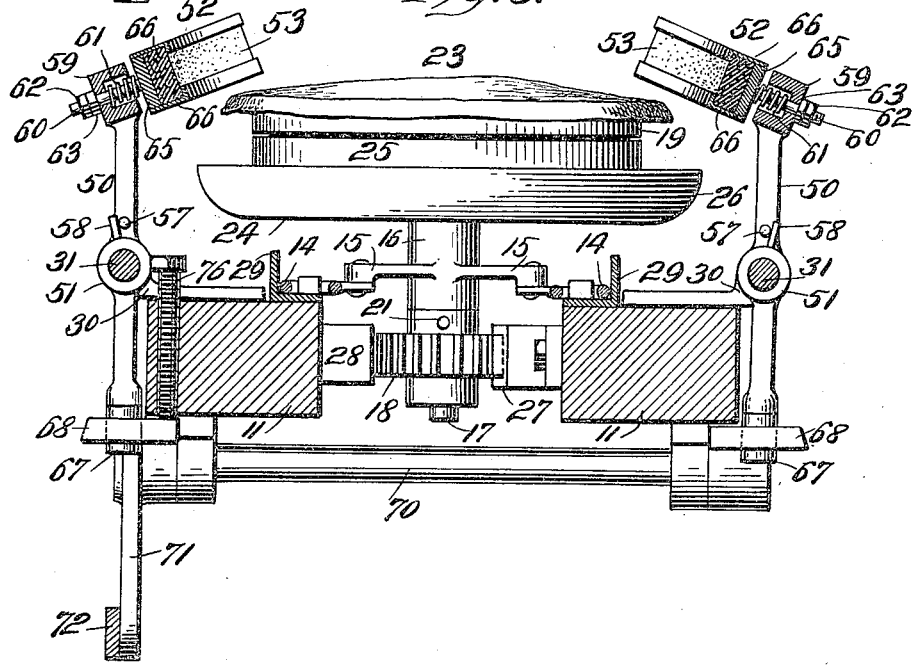
Fig. 6 is a corresponding view of the same illustrating the normal position of the pie preparatory to the segmental trimmers being pressed toward each other and against opposite sections of the crust-dough or to the position shown in Fig. 5, Fig. 6 being a vertical transverse section on the dotted line 6—6 of Fig. 2.

At a suitable location along the length of the table 10, are mounted in bearings 30 secured to the rails 11, two oppositely disposed corresponding longitudinal rods 31, these rods being located adjacent to the outer upper corners of the rails 11, as shown in Figs. 2, 5 and 6. The rods 31 at their front ends have rigid collars 32 and enter air-cushioning cylinders or sockets 33 having a small outlet vent 34 (Fig. 1), and upon the rods 31 between the collars 32 and the adjacent bearings 30 are placed coiled springs 35 which normally hold the rods 31 in normal position and return said rods to such position after they have been slid forwardly through their bearings 30. The cushioning cylinders 33 are provided to cushion the thrust of the rods 31 when said rods are returned to their normal position by the springs 35. When the rods 31 are moved onwardly in the direction of the travel of the chains 14, the collars 32 compress the springs 35 against the adjacent bearings 30, and when the rods 31 are released to return to their normal position, the expansion of the springs 35 acts to restore said rods to such normal position.

At the front end portion of the machine, being the left hand end looking at Figs. 1 and 2, I provide the crust crimping mechanism which comprises in the present instance a ring-frame 36 serrated on its lower face, as at 37, and having side arms 38 which are perforated and slidable upon vertical rods 39 secured to the rods 31 hereinbefore referred to. The arms 38 of the ring-frame 36 rest upon spiral springs 40 which are upon the rods 39, and said frame is held down upon the springs 40 by means of pins 41 extending through said rods 39, as shown in Fig. 7. The frame 36 has centrally of the top thereof a vertical wedge flange 42, forwardly of which is secured to the side rails 11 an inverted U-shaped frame 43 from whose upper transverse portion is suspended a bar 44 carrying a roller 45 in position to be engaged by the wedge 42 during the travel of the crimping frame 36 forwardly with the rods 31 and the pie-holding frames located below said crimping frame. The movement of the wedge 42 against the roller 45 serves to depress the crimping frame 36 downwardly against the rim-portion of the pie located below it, the serrations 37 on the frame 36 making the appropriate imprints in the dough at the rim of the pie. The bar 44 is pivotally secured between lugs 46 rigid with the frame 43 and an upper forwardly projecting end 9 of the bar 44 shoulders, at 47, against an upper forwardly projecting tongue 8 of the transverse member of the frame 43, and hence pressure exerted against the roller 45 by the wedge 42 will be resisted at 47, whereby said roller will remain in stationary position and force the wedge 42 moving against it in a downwardly direction to depress the crimping frame 36. The arm 44 may swing to the left, looking at Fig. 1, but any such movement toward the right, looking at Fig. 1, is resisted at 47. The roller 45 and wedge 42 constitute a convenient means for pressing the frame 36 downwardly against the rim portion of the pie and when this takes place the springs 40 are compressed, and said springs after the roller 45 has ceased to act against the wedge 42, restores the crimping frame 36 to its upper position. The crimping of the pie is performed during a limited forward travel of the chains 14, rods 31 and frames 19, 24 carrying the pie. The rods 31 receive their movement by means which will presently be described.

In advance of the frame 43 of the pie crimping mechanism, or to the right thereof, looking at Figs. 1 and 2, I provide two sets of pie-crust trimming mechanisms, the first set being numbered as a whole, in Fig. 1, 48, and the second set 49, and these two sets of trimming mechanisms act in succession on a pie carried through the machine by means of the chains 14, and said sets of mechanism 48, 49 correspond exactly with each other and are carried by the rods 31.

The pie crust trimming mechanism 48 comprises two oppositely disposed arms 50 having at their central portions bearing sleeves 51 and at their upper portions segmental frames 52 holding segmental blocks of rubber or other yielding material 53 which finally become compressed against the overhanging dough at the edge of the pie-tin, as shown in Fig. 5, and squeeze the surplus dough from said tin. The arms 50 are at the sleeves 51 swiveled upon the rods 31, said sleeves 51 being confined against a collar 54 rigid on said rods and being acted on by a coiled spring 55, one end of which is connected with the sleeve 51 and the other with a rigid collar 56, and said spring has a normal tendency to turn the upper ends of the rods 50 outwardly or to the position shown in Fig. 6, in which position the said arms hold the frames 52 free of the pie. Each arm 50 is equipped with a stop pin 57 which engages a pin 58 secured on the collars 54 and arrests the upper end of the arm 50 against undue outward movement when acted on by the spring 55. The upper ends of the arms 50 have horizontal box members 59 and through these members pass screws 60 for securing the frames 52 thereto, a spring 61 (Fig. 10) being interposed between the frame 52 and a rigid portion of the member or frame 59 and tending to yieldingly press the frame 52 inwardly toward the machine. The screw 60 is provided with nuts 62, 63 which permit of an adjustment of the frame 52 toward or from the frame 59 to meet the requirements of different pie-tins, and said spring 61 permits of the rubber block 53 carried by the frame 59 being yieldingly pressed against the pie-tin, this resiliency of pressure supplementing the resiliency of the rubber segment 53 which is pressed directly against the pie-tin for removing, by a pinching or squeezing action, the surplus crust-dough therefrom. Each frame 59 is provided with guiding pins 64 (Fig. 10) which pass through openings in the frame 59 and serve to support and guide the frame 52 and also to prevent any swiveling of said frame 52 on or with the screw 60.

The pivotally mounted arms 50 of the trimming mechanism 48 are exactly alike, and the segmental frames 52 and their parts secured to the upper ends of said arms are exactly alike, and each of said frames 52 consists of a strong segmental outer plate 65 and upper and lower inwardly projecting corresponding plates 66 flanged toward each other at their inner edges to retain the segmental block of rubber 53, which is pocketed against the plate 65 and between the plates 66 and exposed along its middle inner face to be engaged with the rim of the pie-tin 22, as shown in Fig. 5.

The lower portions of the pivoted arms 50 are exactly alike and carry rollers 67 in line with wedge-plates 68 (Figs. 1 and 9) formed on arms 69 secured upon a transverse shaft 70 and one of which at one side of the main frame 10 has a depending arm 71 which is pivotally connected with a bar or rod 72 which extends forwardly and is pivotally connected with a corresponding arm 71 of the pie-crust trimming mechanism 49, whence the rod 72 continues forwardly and is bent upwardly to form a vertical arm 73 carrying a roller 74. The forward end of the arm 72 is connected by a spring 75 with one of the legs 12 of the frame 10, as shown in Fig. 1.

The wedges 68 for the pie-crust trimming mechanisms 48, 49 are shown in top view in Fig. 9 and in said figure I show the rollers 67 on the lower ends of the arms 50 in their normal position, the same as in Fig. 1, and when said parts are in this position, the pie crust trimming segments 52 will stand in their upper outer position shown in Fig. 6. When the rods 31 are moved forwardly, or to the right, looking at Fig. 1, the lever-arms 50 move with them and the rollers 67 at the lower ends of said arms are caused to travel outwardly on the wedges 68, and in doing so turn the segmental trimming frames 52 inwardly toward each other and against the rim of the pie-tin or to the position shown in Fig. 5. The segmental trimming members 52 turn inwardly toward the pie when the pie is between them and slowly traveling along with the chains 14 and also only when the rods 31 are given a forward traveling movement with said chains by the means hereinafter described, so that said trimming members 52 may move along with the pie and exert their pressure against opposite edges of the pie-tin 22 to squeeze the overhanging surplus dough therefrom. The trimming members 52 will have performed their duty after they have traveled the distance represented by the length of the wedges 68, and thereupon the travel of the rods 31 having ceased, the wedges 68 will be turned downwardly by the movement of the rod 72 against the arms 71, so that said wedges will leave the rollers 67 of the lever-arms 50 and permit the springs 55 to turn the trimming members 52 upwardly and outwardly and the springs 35 to restore the rods 31 and parts carried thereby to their normal position, shown in Fig. 1. I may modify the extent of inward movement of the trimming frames or members 52 by varying the point at which the rollers 67 shall engage the wedges 68, and although this adjustment is naturally slight, it is important and may be accomplished by means of screws 76 (Figs. 5 and 6) which extend down through one side rail 11 and engage the upper surfaces of the adjacent wedges 68 for the mechanisms 48, 49. When the screws 76 are adjusted upwardly, they permit the wedges 68 to turn upwardly to them under the tension of the spring 75 and thus become nearer to the center of the lever arms 50 and positioned to exert a greater inward throw on the segmental trimming members 52.

The trimming mechanism 49 is a duplicate of that numbered 48, and hence without detailing each part of the mechanism 49, I will number the same correspondingly with the mechanism 48. The two mechanisms are alike and have corresponding operation, the mechanism 48 first acting on the pie to trim off opposite sections of the crust-dough thereof and then the mechanism 49 acting against the other two opposite sections of the crust-dough to trim off the same.

The rack-bar 27 is, as shown in Figs. 2 and 9, located intermediate the pie-crust trimming mechanisms 48, 49. The trimming members 52 of the mechanism 48 first act to trim off opposite side sections of the overhanging dough at the rim of the pie, and then as the chains 14 travel onwardly, the pie supporting devices are carried against the rack-bar 27 and caused to make a one-quarter rotation, thereby turning the trimmed portions of the pie longitudinally of the machine and the untrimmed edges thereof sideways of the machine in position during the continued travel of the chains 14 to pass between the trimming members 52 of the mechanism 49 so that the said remaining untrimmed portion of the pie crust may be acted on by said members 52 of the mechanism 49, thereby leaving the pie completely trimmed and ready to be carried along by the chains 14 to the proper point of delivery.

The means for effecting the movement of the rods 31 with the chains 14 while the pies are in engagement with the crimping frame 36 and pie-crust trimming mechanisms 48, 49, comprise a sprocket-wheel 77 (Figs. 3 and 4) secured on a shaft 78 and driven by its engagement with one of the sprocket-chains 14, a crank-wheel 79 secured on said shaft 78, a drive-rod 80 connected with the upper end of a lever 81 and a pin 82 carried by the crank-wheel 79 and adapted during each rotation of said wheel to enter a recess 83 in the arm or rod 80 and pull said rod 80 forwardly in the direction of travel of the chains 14. The lower end of the lever arm 81 is secured on one end of a rock-shaft 84 which extends across the machine and has at the other side thereof a corresponding lever arm 85. The lever arms 81, 85 are alike, and both are connected by blocks 86 with the rods 31, as shown in Fig. 2, and hence the movement of the rod 80 is imparted to the lever arms 81, 85 and by them to the rods 31. It is only intended that the rods 31 shall travel with the chains 14 a distance just sufficient to permit of the proper operation on the pies by the crimping frame 36 and trimming mechanisms 48, 49, and hence the pin 82 carried by the crank-wheel 79 draws the rods 31 forwardly in proper timing and then leaves the recess 83 of the rod 80, and at that time the rod 80 becoming released, the springs 35 may restore the rods 31 and through them the lever arms 81, 85 and other parts connected with said rods 31 to their normal position. Just at the time that the pin 82 leaves the recess 83 of the rod 80 and therefore releases said rod, a cam 86 carried by the crank-wheel 79 engages the roller 74 at the upper end of the member 73 of the rod 72 and forces said rod toward the left, looking at Fig. 1, against the opposition of the spring 75, said rod 72 then serving to turn, through the arms 71 and shafts 70, the wedges 68 downwardly from the rollers 67 of the levers 50, the result being that, said wedges being lowered from said rollers, the springs 55 are permitted to immediately turn the trimming members 52 outwardly in a direction from the pie they may have been in engagement with. After the trimming members 52 have been turned outwardly and the rods 31 restored to normal position by the springs 35, the cam 86 will leave the aforesaid roller 74 and permit the spring 75 to restore the rod 72, lever arms 71 and wedges 68 to their normal position, shown in Fig. 1, preparatory to the operation being repeated as another pie is carried along by the chains 14 to the mechanisms for treating the same.

The operation of the machine will be understood from the detailed explanations already made without special further description. The endless chains 14 will be supplied with a series of the pie-carrying supports, and said chains may have a continuous movement. As a pie reaches the crimping mechanism, the rods 31 are caused to travel forwardly with the chains 14 during a limited extent of the movement of the latter, said rods being actuated from the crank-wheel 79, rod 80 and levers 81, 85. The movement of the rods 31 effects a forward movement of the rods 39 carrying the crimping ring 36, and hence the wedge 42 is moved against the roller 45 and the ring 36 is depressed against and crimps the pie-crust dough without retarding the travel of the chains 14. When the crank-wheel 79 carries its pin 82 beyond the recess 83 in the rod 80, the springs 35 restore the operative parts to normal position. When the pie has traveled from the crimping mechanism to the trimming mechanism 48, the rods 31 are again caused to travel with the chains 14, and the movement of the levers 50 against the wedges 68 effect the movement of the segmental trimming members 52 inwardly and downwardly against the opposite edge portions of the pie-tin, thereby cutting off the overhanging dough at said opposite portions of the pie-tin, this taking place without interfering with the travel of the chains 14. After the segmental trimming devices 52 of the mechanism 48 have performed their duty, the rollers 67 on the levers 50 are relieved from wedges 68 and the springs 55 turn said segmental trimmers upwardly and outwardly from the pie. When the chains 14, continuing in movement, carry the gear-wheel 18 of the pie-supporting frame against the rack 27, the pie support and therewith the pie have a quarter-turn imparted to them, and then on the further travel of the pie the untrimmed opposite portions of the pie-crust dough become engaged by the trimmers 52 of the mechanism 49, with the result that the overhanging dough at the previously untrimmed sections of the pie-crust are removed. The operation of the segmental trimmers 52 has been fully described hereinbefore. Each of these segmental trimmers may define one-quarter of a circle, but preferably I make them a little longer than the one-quarter dimension so that after one pair of the trimmers 52 have acted, the other pair of trimmers 52 may assuredly trim off all of the remaining portion of the overhanging dough from the rim of the pie-tin. I do not limit my invention therefore to any specific length of the segmental trimmers 52, but preferably they will be something more than one-quarter of the diameter of the pie tin. The yielding or rubber segmental blocks or strips carried by the trimmers 52 act efficiently, in the manner shown in Fig. 5, against the edge of the pie-tin for trimming off such dough as may be overhanging the same, and the fact that the blocks or strips 53 are of yielding material aids in the trimming or pinching or squeezing off of the surplus dough in a finished manner, and in addition the yielding character of the blocks or strips 53 adapts them to act efficiently regardless of the usual irregularities of the dough at the edge of the pie-tin and of said edge itself.

There will be a number of pies traveling with the chains 14 at the same time, and I contemplate that these pies shall be acted on one after another in succession by the crimping ring 36 and the trimming mechanism 48, 49, but in the actual operation there is a pie below the crimping ring 36, a pie at the trimming mechanism 48 and a pie at the trimming mechanism 49 all being acted on at one time and during one forward travel of the rods 31. While the pies are acted on successively by the crimping and trimming mechanisms, the capacity of the machine becomes increased when the crimping and trimming mechanisms are all in action on the pies reaching them during the travel of the chains 14. The capacity of my machine is also increased from the fact that I do not have to stop the chains 14 in their travel while the crimping and trimming mechanisms are performing their duties. In accordance with my invention the crimping and trimming mechanisms, while at work, travel with the chains 14 and the pies against which they act, the rods 31 and parts connected with them moving forwardly during their period of work with and by power derived from the chains 14 and thereafter being released from the influence of said chains to return to their initial position preparatory to their further operation.

I do not limit my invention to all of the details of actuating mechanism hereinbefore described, since I am aware that these details may be modified within the range of mechanical skill without departure from my invention as claimed. I desire to secure adequate protection for my invention.

The invention is not limited specifically to the presence of the serrations on the crimping ring 36, since I have found the ring 36 is beneficial regardless of the serrations 37 in pressing the dough downwardly against the rim portion of the pie tin and imparting a firmness thereto which facilitates the subsequent trimming of the overhanging dough from the edge of the tin.

What I claim as my invention and desire to secure by Letters Patent, is:

1. In a machine for treating the crust-dough of pies at the rim thereof, a support for a pie-tin, a conveyer for carrying said support along a fixed path, segmental trimmers at opposite sides of the path of the pie-tin having concave surfaces adapted to the edge of the pie-tin, means for closing said trimmers toward each other and against the pie-tin for squeezing overhanging dough therefrom and means for effecting the travel of said trimmers for a limited distance with the pie-tin while in operative engagement therewith.

2. In a machine for treating the crust-dough of pies at the rim thereof, a support for a pie-tin, a conveyer for carrying said support along a fixed path, segmental trimmers at opposite sides of the path of the pie-tin having concave surfaces adapted to the edge of the pie-tin, means for closing said trimmers toward each other and against the pie-tin for squeezing overhanging dough from opposite edges thereof, means for effecting the travel of said trimmers for a limited distance with the pie-tin while in operative engagement therewith, means for thereafter turning said support and pie-tin a part of a rotation during the continued travel of the same to present the untrimmed portions of the crust-dough outwardly, a second pair of segmental trimmers having concave facing surfaces to engage the edge of the pie-tin and disposed at opposite sides of the path of travel thereof and in advance of the first trimmers, means for closing said second trimmers toward each other and against the pie-tin for squeezing overhanging dough therefrom, and means for effecting the travel of said second trimmers for a limited distance with the pie-tin while in operative engagement therewith.

3. In a machine of the character described, a support for a pie-tin, a conveyer for carrying the support along a fixed path, segmental trimmers having concave yielding surfaces adapted to the edge of the pie-tin, means for closing said trimmers against said edge for squeezing overhanging dough therefrom, means for effecting the travel of said trimmers for a limited distance with the pie-tin while in operative engagement therewith, and means for thereafter releasing the trimmers from the pie-tin and returning them to their initial position.

4. In a machine of the character described, a support for a pie-tin, a conveyer for carrying said support along a fixed path, two sets of segmental trimmers arranged for successive operation against opposite edge portions of the pie-tin for squeezing overhanging dough therefrom, said trimmers having concave yielding parts to engage said edge, means for successively closing said sets of trimmers against the edge of the pie-tin as said tin passes to them, means disposed between the sets of trimmers for thereat giving the pie-tin a partial rotation, means for effecting the travel of said trimmers for a limited distance with the pie-tin while in operative engagement therewith, and means for thereafter releasing the trimmers from the pie-tin and returning them to their initial position.

5. In a machine for treating the crust-dough of pies at the rim thereof, a support for a pie-tin, a conveyer for carrying said support along a fixed path, a pressing-ring normally located above the path for the pie, means for pressing said ring downwardly against the pie at the rim thereof, means for effecting the travel of said ring for a limited distance with the pie while in engagement therewith, segmental trimmers in advance of said ring and at opposite sides of the path of the pie-tin having concave surfaces adapted to the edge of the pie-tin, means for closing said trimmers toward each other and against the pie-tin for squeezing overhanging dough therefrom and means for effecting the travel of said trimmers for a limited distance with the pie-tin while in operative engagement therewith.

6. In a machine for treating the crust-dough of pies at the rim thereof, a support for a pie-tin, a conveyer for carrying said support along a fixed path, a pressing-ring normally located above the path of the pie, means for pressing said ring downwardly against the pie at the rim thereof, means for effecting the travel of said ring for a limited distance with the pie while in engagement therewith, segmental trimmers in advance of said ring and at opposite sides of the path of the pie-tin having concave surfaces adapted to the edge of the pie-tin, means for closing said trimmers toward each other and against the pie-tin for squeezing overhanging dough from opposite edges thereof, means for effecting the travel of said trimmers for a limited distance with the pie-tin while in operative engagement therewith, means for thereafter turning said support and pie-tin a part of a rotation during the continued travel of the same to present the untrimmed portions of the crust-dough outwardly, a second pair of segmental trimmers having concave facing surfaces to engage the edge of the pie-tin and disposed at opposite sides of the path of travel thereof and in advance of the first trimmers, means for closing said second trimmers toward each other and against the pie-tin for squeezing overhanging dough therefrom, and means for effecting the travel of said second trimmers for a limited distance with the pie-tin while in operative engagement therewith.

7. In a machine for treating the crust-dough of pies at the rim thereof, a support for a pie-tin, a conveyer for carrying said support along a fixed path, a pressing-ring having lower surfaces adapted for crimping purposes normally located above the path for the pie, means for pressing said ring downwardly against the pie at the rim thereof, means for effecting the travel of said ring for a limited distance with the pie while in engagement therewith, concave segmental trimmers in advance of said ring and means for closing said trimmers against opposite edges of the pie-tin for squeezing overhanging dough therefrom.

8. In a machine of the character described, a support for a pie-tin, a conveyer for carrying the support along a fixed path, segmental trimmers having concave surfaces of resilient material adapted to the edge of the pie-tin, means normally holding said trimmers away from said tin, means for effecting the travel of said trimmers for a limited distance with said support, means for closing said trimmers, during their travel, toward and maintaining them against the edge of the pie-tin for squeezing overhanging dough therefrom, and means for returning said trimmers, when released from the pie-tin, to their initial position.

9. In a machine of the character described, a support for a pie-tin, a conveyer for carrying the support along a fixed path, segmental trimmers having concave surfaces of resilient material adapted to the edge of the pie-tin, means normally holding said trimmers away from said tin, means for effecting the travel of said trimmers for a limited distance with said support, means for closing said trimmers, during their travel, toward and maintaining them against the edge of the pie-tin for squeezing overhanging dough therefrom, and means for returning said trimmers, when released from the pie-tin, to their initial position, said trimmers each comprising a box-like head holding said resilient material, a lever supporting said head and a spring interposed between said head and its support for yieldingly backing said head, and the means for closing said trimmers against the pie-tin comprising wedges against which their supporting levers are carried as the trimmers are moved to travel with the pie-support.

10. In a machine of the character described, a support for a pie-tin, a conveyer for carrying the support along a fixed path, segmental trimmers having concave surfaces of resilient material adapted to the edge of the pie-tin, means normally holding said trimmers away from said tin, longitudinally movable supports for said trimmers, means actuated from said conveyer for effecting the travel of said trimmers for a limited distance with said support, means for closing said trimmers, during their travel, toward and maintaining them against the edge of the pie-tin for squeezing overhanging dough therefrom, and means for returning said trimmers, when released from the pie-tin, to their initial position.

11. In a machine of the character described, a support for a pie-tin, a traveling conveyer for carrying said support along a fixed path, two sets of segmental trimmers arranged for successive operation against opposite edge portions of the pie-tin for squeezing overhanging dough therefrom, said trimmers having concave resilient surfaces to simultaneously engage opposite portions of said edge, means for successively closing said sets of trimmers against the edge of the pie-tin as said tin passes to them, means disposed between the sets of trimmers for thereat giving the pie-tin a partial rotation, means for effecting the travel of said trimmers for a limited distance with the pie-tin while in operative engagement therewith, means for thereafter releasing the trimmers from the means effecting their travel, means for then releasing the trimmers to move outwardly from the pie-tin and means for returning the trimmers to their initial position.

12. In a machine of the character described, a support for a pie-tin, a traveling conveyer for carrying said support along a fixed path, two sets of segmental trimmers arranged for successive operation against opposite edge portions of the pie-tin for squeezing overhanging dough therefrom, said trimmers having concave resilient surfaces to simultaneously engage opposite portions of said edge, means for successively closing said sets of trimmers against the edge of the pie-tin as said tin passes to them, means disposed between the sets of trimmers for thereat giving the pie-tin a partial rotation, longitudinally movable supports for said trimmers, means actuated from said conveyer for effecting the travel of said trimmers for a limited distance with the pie-tin while in operative engagement therewith, means for thereafter releasing the trimmers from the means effecting their travel, means for then releasing the trimmers to move outwardly from the pie-tin and means for returning the trimmers to their initial position.

Signed at New York city, in the county of New York and State of New York, this 20th day of October, A. D. 1921.

FROM C. EILERSEN.